May 22, 1923.

H. C. LOGAN 1,456,184

DIRIGIBLE HEADLIGHT MOUNTING

Filed Feb. 23, 1921

Inventor

Harry C. Logan.

By C. C. Shepherd
Attorney

May 22, 1923.  
H. C. LOGAN  
1,456,184  
DIRIGIBLE HEADLIGHT MOUNTING  
Filed Feb. 23, 1921  
2 Sheets-Sheet 2

Inventor  
Harry C. Logan.  
By C. C. Shepherd.  
Attorney

Patented May 22, 1923.

1,456,184

UNITED STATES PATENT OFFICE.

HARRY C. LOGAN, OF ROCKBRIDGE, OHIO.

DIRIGIBLE HEADLIGHT MOUNTING.

Application filed February 23, 1921. Serial No. 447,145.

*To all whom it may concern:*

Be it known that HARRY C. LOGAN, a citizen of the United States, residing at Rockbridge, in the county of Hocking and State of Ohio, has invented certain new and useful Improvements in Dirigible Headlight Mountings, of which the following is a specification.

This invention relates to improvements in motor vehicles and has particular reference to the head light construction and mountings thereof, the primary object in view being to produce a dirigible mounting for such head light which will enable the latter to oscillate about vertical pivots therefor in order that the light rays, emitted from the lamps, will be cast in a direction controlled entirely by the path of movement of the steering wheel, and to thus enable the light to be automatically shifted contemporaneously with the changing position of the steering wheel and prior to the subsequent turning of the vehicle proper, in order that the premises immediately preceding the vehicle will be instantly illuminated and accidents, incident to improper illumination, largely obviated.

A further object is to produce a construction involving a dirigible mounting for vehicle head lights which will be convenient to apply, substantial and simple in construction, economical to manufacture and wherein an improved flexible joint structure is provided for accommodating the vehicle, lamp rigging to the relative movements which exist in operation between the portion of the vehicle upon which the lights are carried and the axle construction thereof.

For a further understanding of the invention, reference is to be had to the accompanying drawing and to the following specification, in which the various details of the invention have been specifically described and their scope pointed out in the appended claim. In said drawing:

Figure 1:
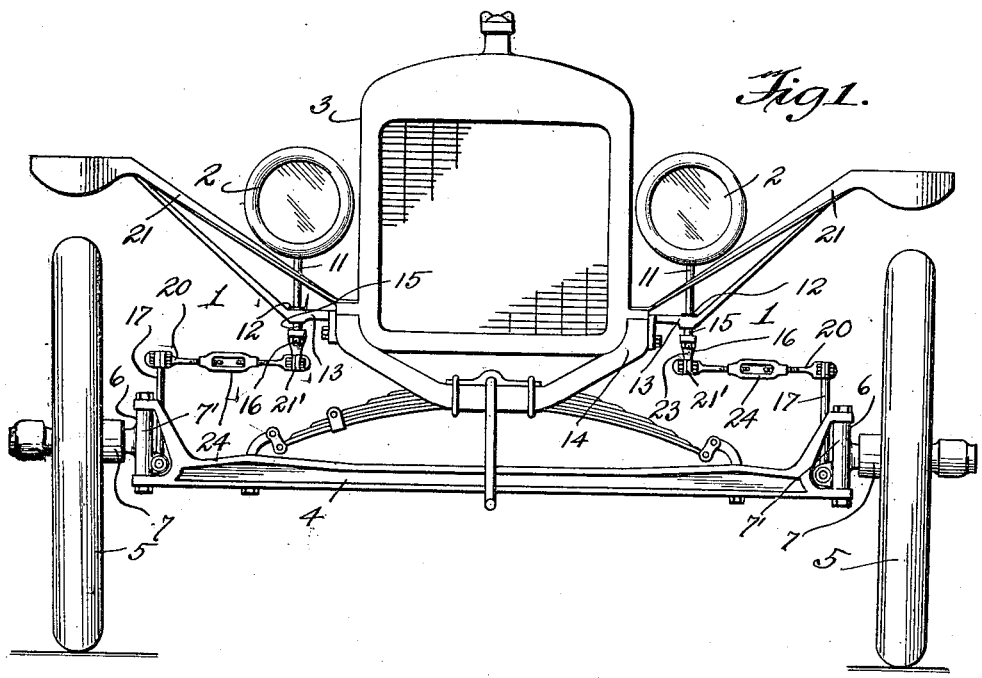
Figure 1 is a front elevation of a motor vehicle equipped with the improved light mounting comprising the present invention.
Figure 2:
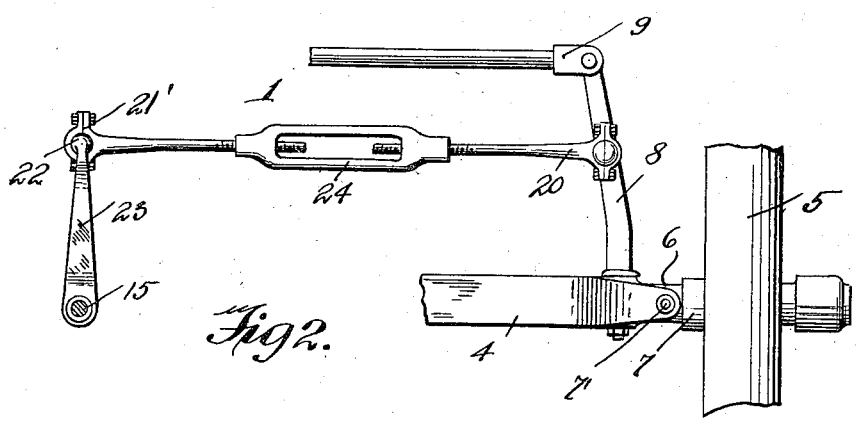
Figure 2 is a detail top plan view of the mounting.
Figure 3:
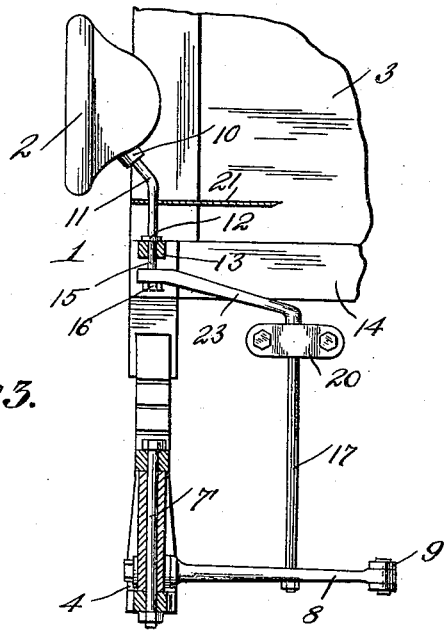
Figure 3 is a vertical sectional view thereof.
Figure 4:
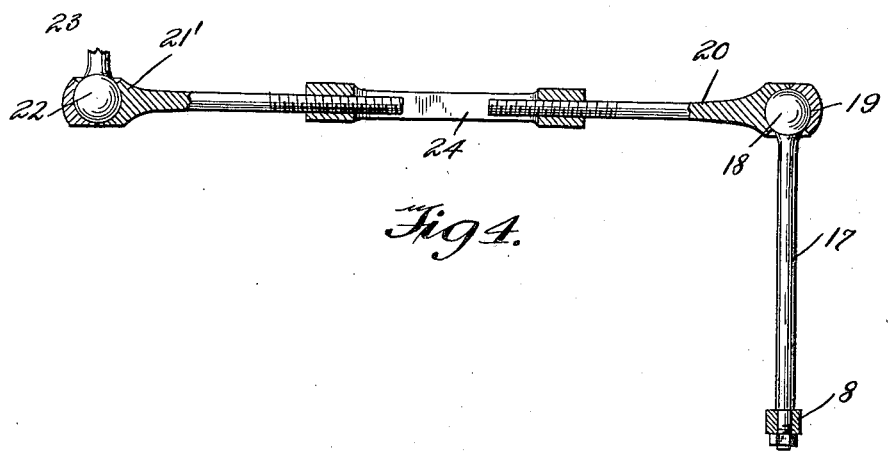
Figure 4 is an elevation of the means connecting the head-light operating arm with the steering mechanism.

Referring more particularly to the details of the invention, I employ a dirigible headlight mounting 1 which is adapted to be employed in connection with the forward head-light 2 of a motor vehicle 3, the latter being formed to include the usual front axle construction 4, steering wheels 5 and the customary knuckle joint structures 6 between the outer end of the axle 4 and the wheels 5. The joints 6 are of customary construction and include axle spindles 7 around which the wheels 5 are free to rotate. Also, the joints are free to rotate about vertical pivots 7' and in this manner to govern the steering positions of the wheels 5. In effecting the rotation of the knuckles 6, the latter are equipped with the customary rearwardly extending arms 8, to the outer ends of which a connecting link 9 is pivotally secured. It will be understood that the link 9 is adapted to be transversely shifted for the purpose of controlling the positions of the wheels 5, the shifting of the link 9 being effected by the customary steering wheel mechanism, not shown.

The head-lights 2 are of any suitable construction and are provided on their under sides with socketed enlargements 10, in which are positioned the upper ends of a pair of rod shaped supporting members 11, the latter having their lower ends provided with collars 12, which are adapted to rest upon the upper surfaces of fixed brackets 13 carried from the frame 14 of the vehicle, the said members 11 being provided with portions 15 which extend through openings provided in the brackets 13, and have their lower ends equipped with fastening nuts 16, the construction thus described serving to enable the lamps not only to be supported for use but also to enable the same to swing horizontally about the vertical pivots provided at the lower ends of the supporting members 11.

To automatically effect the oscillation of the lights 2, in accordance with the oscillation of the wheels 5, the arms 8 are, in this instance, equipped with vertically upstanding rods 17, which have their lower ends rigidly secured in connection with the arms of the steering knuckle. The upper ends of the rods 17 are equipped with ball shaped enlargements 18, which are adapted to be received within similarly formed sockets 19 provided upon one end of a reciprocatory link 20. This link extends transversely of the vehicle 3 and is situated beneath the fender construction 21 thereof and between the sides of the frame 14 and the wheels 5, the inner ends of said links being terminated in clamps 21', having sockets formed therein for the reception of the ball shaped enlargements 22 provided upon the lower ends of a pair of crank arms 23. These arms have their opposite ends rigidly connected with the lower portions 15 of the lamp supports, whereby upon the reciprocation of the links 20, motion will be imparted to said support to permit of corresponding rotation on the part of the light 2. Preferably, the links 20 are provided, intermediately of their lengths, with turn-buckles 24, in order that the effective length of said links may be contracted or expanded.

In view of the foregoing it will be apparent that the present invention provides a simple, substantial and improved mounting for turning the head-lights of a motor vehicle simultaneously and to the same extent in accordance with the degree of deflection from the longitudinal of the wheels 5. The construction is capable of being readily applied to standard makes of motor vehicles, and does not necessitate altering or changing the construction of such vehicles to effect the use and application of the mounting. By its construction, and particularly the ball and socket joints at the ends of the links 20, the mounting is adapted to compensate for the irregularities in position of the frame 14 and the axle construction 4, or in other words to be able to readily compensate for the resilient or spring action of the vehicle body. It will be manifest that when the steering knuckles are turned, motion will be imparted to the rods 17, which causes the transverse shifting of the link 20 and consequent desired changes in position of the head-lights.

What is claimed is:

The combination with a steering mechanism of a vehicle including rearwardly extending horizontal arms, of vertical rods having their lower ends rigidly secured to the arms intermediate the ends thereof, brackets carried by the vehicle frame, lamp supporting rods journaled vertically intermediate their ends in said brackets, crank arms having their forward ends rigidly connected with the lower ends of the lamp supporting rods, adjustable sectionalized links having their inner ends pivotally connected to the inner ends of the crank arms and their outer ends similarly connected to the upper ends of the vertical rods, the pivotal connection of the lamp supporting rods and knuckles of the steering mechanism being in direct alignment.

In testimony whereof I affix my signature.

HARRY C. LOGAN.